Sept. 8, 1936.  R. R. HOLDEN ET AL  2,053,558
TROLLEY SWITCH
Filed May 11, 1932  2 Sheets-Sheet 1
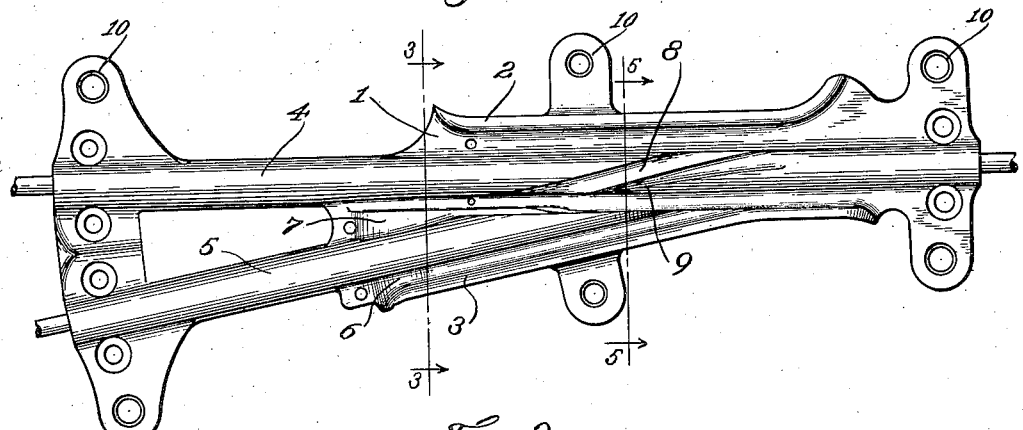
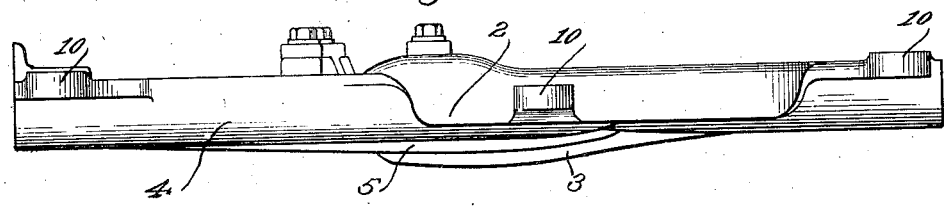
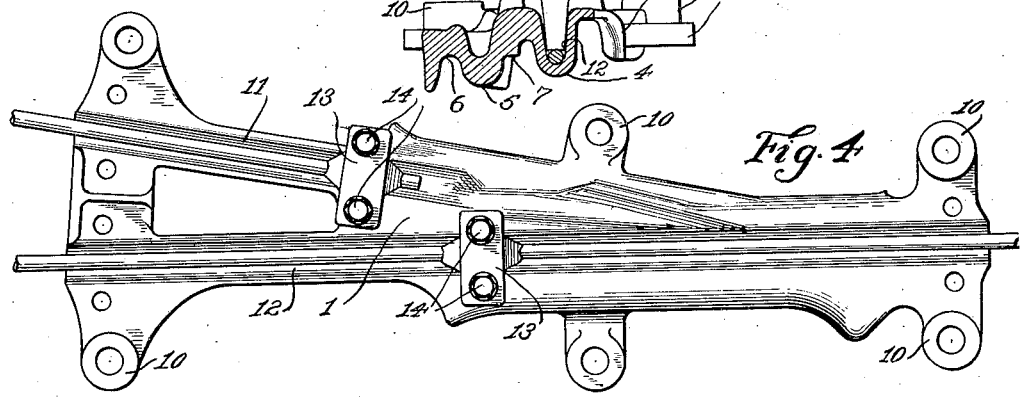
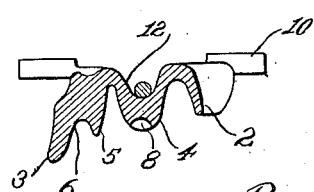
Inventors
Richard R. Holden.
Almour W. Nelson.
By Jones, Addington, Ames & Seibold
Attys.

Sept. 8, 1936.  R. R. HOLDEN ET AL  2,053,558
TROLLEY SWITCH
Filed May 11, 1932   2 Sheets-Sheet 2
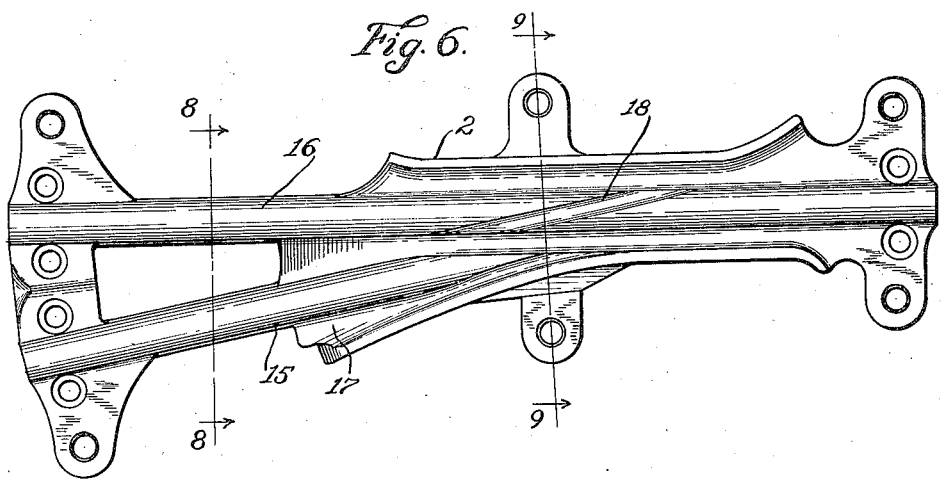
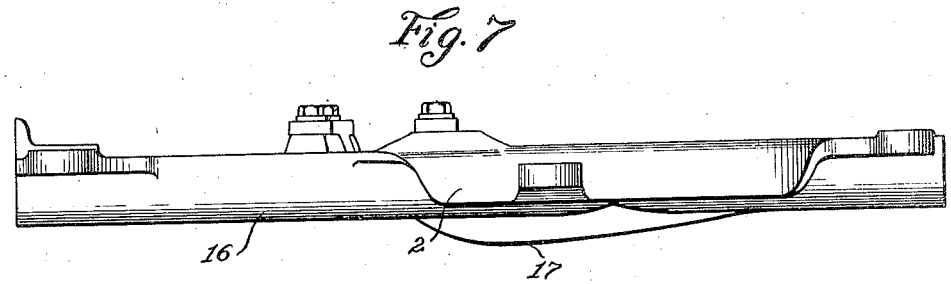
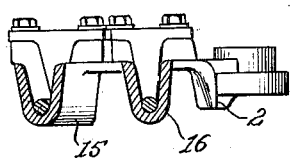 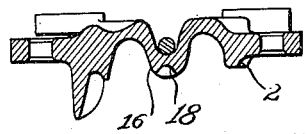
Inventors
Richard R. Holden
Almous W. Nelson
By Jones, Addington, Ames & Seibold
Attys.

Patented Sept. 8, 1936

2,053,558

UNITED STATES PATENT OFFICE 2,053,558

TROLLEY SWITCH

Richard Roy Holden, Highland Park, and Almour W. Nelson, Chicago, Ill.; said Nelson assignor to said Holden Application May 11, 1932, Serial No. 610,542

31 Claims. (Cl. 191—37)

This invention relates to overhead trolley apparatus and has special reference to frogs or switches and the like.

More particularly this invention relates to a frog or switch having a continuous main runner and a side runner in which a current-collecting member may smoothly pass from the side runner to the main runner at almost any speed without any jumping or sudden passing from one level to another, and the current-collecting member passing under said main runner may be controlled and prevented from switching to the side runner.

Various types of frogs or switches have been heretofore used in overhead trolley systems but there are disadvantages inherent in their use. In some of them a plate is used having one end flared outwardly with depending flanged sides to maintain the current-collecting member thereon. The side runner and both ends of the main runner slope down to the plate surface against which the current-collecting member rides in passing from one to the other.

In sliding over the plate surface between the ends of the runners there is no guide for the current-collecting member except the flanges which only prevent it from sliding off the sides of the plate. Consequently, if there is any side pull to the current-collecting member, or the passage from the side to the main runner is at any but a slow speed, the current-collecting member is very likely to jump away from the runners and wire, or in passing along the main runner the current-collecting member may switch to the side runner. Such a construction is, therefore, only a hit-or-miss proposition.

Another type of frog or switch devised to overcome the disadvantages of the previously discussed type is provided with a spring or movable member secured to one end of one of the runners and held in engagement with another runner which serves to guide the current-collecting member passing under the plate from the side runner or one of the main runners to the other main runner and also to prevent the current-collecting member from passing from the main runners to the side runner. In this type, the movable parts frequently are broken or get out of order. Unless the movable or spring member is extremely flexible, in which case it will not stand hard usage, the current-collecting member is likely to be thrown off the runners unless the passage is at a slow rate of speed.

Still another prior type is provided with a continuous main runner and a side runner which projects downwardly from the plate considerably farther than the main runner whereby the current-collecting member coming onto the switch or frog from the side runner is lowered so that it may jump from the side runner onto the main runner. Here, again, if the passage is at any but a slow speed, or there is any side pull on the current-collecting member, the member is frequently thrown from engagement with the runners.

At the present time with the increasing use of trolley bus systems, the problems to be overcome are greater and more varied than when only electric railways were used, and it is the purpose of the present invention to provide a frog or switch which will overcome the deficiencies present in the prior art and which at the same time is designed for use in trolley bus systems either with a trolley wheel or trolley shoe, as well as in electric railway systems.

The present invention relates to a trolley switch or frog which may comprise a continuous main runner and a side runner terminating at its inner end adjacent the main runner. The main runner may be provided with a diagonal or substantially helical groove in the lower side thereof substantially opposite or adjacent the inner end of the side runner. This groove extends upwardly in the sides of the main runner a distance less than the distance between the inner face of a trolley wheel or shoe and the flanges thereof so that, when the current-collecting member normally engages the main runner, the flanges of the current-collecting member extend upwardly beyond the uppermost portions of the groove. Base walls are preferably provided on either side of the inner end of the side runner so that a current-collecting member passing from the side to the main runner will engage the base walls and the wearing surface of the groove during the passage. It is also desirable to provide depending guide flanges which are spaced from the outer sides of the two runners.

Our new and improved form of trolley frog or switch may be used with a trolley wheel or shoe carried by either a fixed or swivel harp. Where the current-collecting member is carried by a swivel harp, there is practically no possibility of the same switching from the main to the side runner of the switch, even though there is considerable side pull. The swivel harp is usually employed on trolley busses. In such cases the bus frequently is off to one side of the trolley wire, thus exerting a substantial side pull on the current-collecting member. Even when the side pull is in the direction of the side runner, the current-collecting member carried by the swivel harp will not transfer from the main runner to the side runner. However, the passing from the side runner to the main runner is very smooth and may be made at comparatively high speeds. This is because the change of level of the current-collecting member during the passage under the switch is slight and is very gradual.

The present invention is equally suited for use with vehicles employing trolley shoes or wheels carried by fixed harps. Ordinary street cars generally use the fixed harps. When the trolley wheel or shoe is carried by a fixed harp, the present invention acts as a selective switch to automatically direct the current-collecting member to the trolley wire under which the street car or other vehicle is running. Thus, if the street car passes under the switch and continues straight ahead, there is no possibility of the current-collecting member switching from the main runner to the side runner. If, on the other hand, the vehicle turns so as to run under the trolley wire connected to the side runner, the trolley wheel or shoe is automatically switched to the side runner. The reason for this is that the current-collecting member is generally to the rear of the vehicle and does not come in contact with the switch until after the vehicle has turned at least part way. This causes the current-collecting member, due to its angle with the trolley wire, to ride down lower on the trolley wire and the main runner of the switch. In this position, it will engage the groove in the main runner and be directed to the side runner. The passage from the side to the main runner occurs just the same as when the current-collecting member is carried by a swivel harp.

Furthermore, in our construction the current-collecting member may smoothly pass at any speed within reasonable limits from the side runner to the main runner without any jumping from one to the other and with substantially no, or only a slight and gradual change in level, while, at the same time, making full contact with the runners. We accomplish this without the use of any movable parts.

An object of this invention is to provide a frog or switch having a continuous main runner and a side runner and in which the current-collecting member may smoothly pass without jumping and with practically no, or only a slight and gradual change in level from the side runner to the main runner while making full contact at all times.

Another object of this invention is to provide a frog or switch in which there is substantially no possibility of a current-collecting member carried by a swivel harp passing from the main to the side runner even when there is considerable side force exerted by the current-collecting member.

A further object of this invention is to provide a frog or switch which, when a current-collecting member carried by a fixed harp is employed, will automatically direct the current-carrying member to the proper line according to the path of travel of the vehicle carrying the same.

Still another object is to provide a frog or switch of simple construction without any movable parts which will stand hard usage and great wear without injury therefrom.

Further objects and advantages will be apparent from the following description when taken together with the accompanying drawings, in which latter:

Figure 1 is a bottom plan view of a switch or frog for use in overhead trolley systems;

Fig. 2 is a side elevational view of the device shown in Fig. 1;

Fig. 3 is a cross sectional view taken on the line 3—3 of Fig. 1;

Fig. 4 is a top plan view of the device shown in Fig. 1;

Fig. 5 is a cross sectional view taken on the line 5—5 of Fig. 1;

Fig. 6 is a bottom plan view of a frog or switch illustrating another embodiment of the present invention;

Fig. 7 is a side elevational view of the device shown in Fig. 6;

Fig. 8 is a cross sectional view taken on the line 8—8 of Fig. 6; and

Fig. 9 is a cross sectional view taken on the line 9—9 of Fig. 6.

Referring to the drawings, and more particularly to Figs. 1 to 5, the construction shown comprises a base portion 1 which gradually widens from one end toward the other as shown in Fig. 1. Downwardly depending flanges 2 and 3 may be provided on the sides of the base portion to assist in guiding the current-collecting members passing thereunder. The flange 3 may extend below the lower edge of the flange 2. The ends of the flanges are preferably curved outwardly.

A continuous main runner 4 is spaced from and is substantially parallel to the flange 2. A side runner 5 which terminates adjacent the main runner 4 is spaced from and is substantially parallel to flange 3. The side runner 5 preferably gradually slopes downwardly from the outer end so that at the inner end thereof it extends farther below the base portion 1 than the main runner 4 as shown particularly in Figs. 2, 3, and 5. The runners 4 and 5 are spaced from the flanges 2 and 3, respectively, a distance sufficient to permit the passage of one side of a trolley wheel or shoe therebetween, in effect forming a groove in which the sides of flanges of a current-collecting member may ride.

The inner end of the side runner 5 may be cut on a bias and is preferably parallel to and spaced from the adjacent side of the main runner 4 a distance sufficient to permit the passage of one side of a current-collecting member therebetween.

On each side of the side runner 5 adjacent the inner end thereof are downwardly depending base walls 6 and 7. Base wall 6 is positioned along the outer edge of the side runner 5 and extends beyond the end of the side runner, while base wall 7 lies between the two runners along the inner side of the side runner and is spaced from the main runner, with the inner end merging into the portion of the side wall cut on a bias. The base walls 6 and 7 are preferably formed with the ends thereof, except for the inner end of base wall 7, gradually sloping upwardly toward base portion 1. The faces of the opposite portions of the base walls are substantially similarly situated with respect to the distances thereof above the side runner 5. In effect, the base walls may be considered as a single surface, with the side runner 5 projecting downwardly from this surface.

In use, when a current-collecting member passes from the side runner to the main runner, the edges thereof slide over the base walls, which, being in effect a plane surface, will maintain a current-collecting member in its ordinary position with substantially no tilting.

The distances from the lower surface of the depending base walls 6 and 7 to the bottom side of the side runner 5 may be substantially the same as the distance from the inner surface of the current-collecting trolley or shoe to the outer edges thereof, so that as the current-collecting member passes over the inner end of the side runner 5, there is substantially a three-point contact.

A substantially diagonal or helical groove 8 is provided in the main runner 4 substantially adjacent the inner end of the side runner 5, where the latter is cut on the bias. Groove 8 extends from a point beyond the inner end of base wall 7 substantially as far as the end of base wall 6. The portions of the upper face of channel 8 and the face of base wall 6 opposite each other are substantially similarly situated with respect to the distances thereof above the runners. Groove 8 is substantially a continuation of base wall 7 for the passage of one side of a current-collecting member, while base wall 6 engages the other side of the current-collecting member during the passage.

While the side runner preferably is formed with the inner end thereof cut on a bias with the slot 8 opposite the end portion, as shown in the drawings, the side runner may have the inner end thereof cut off above the end of said groove, and in describing the position of the groove the phrase "adjacent the inner end of the side runner" is intended to cover either construction or any modification thereof.

In order to prevent the current-collecting member passing along the main runner from engaging the groove 8 and switching to the side runner 5, the upper edges of groove 8, particularly that portion on the outer side of main runner 4, extends upwardly from the lower edge of the main runner a distance less than the distance between the upper edges or flanges of the current-collecting member and the inner face thereof. Thus, in passing along the main runner 4, the upper edges or flanges of the current-collecting member extend upwardly beyond the uppermost portions of the groove 8.

In passing from the side runner 5 to the main runner 4, the current-collecting member straddling the side runner engages the base walls 6 and 7 on each side of the inner end of the side runner as well as the side runner itself. Thereafter, the inner side of the current-collecting member engages the channel 8 and the other side continues to slide over the base wall 6 straddling the inner end of the side runner 5 and the reduced portion 9 of the main runner 4. As the current-collecting member progresses further, it entirely engages the main runner 4 and continues therealong. With this construction, there is no jumping and the current-collecting member smoothly passes from the inner end of the side runner 5 which projects slightly below the main runner 4 onto the main runner 4 by means of the channel 8 and the base walls 6 and 7. Due to the fact that the channel 8 is preferably of helical shape, the change of direction from the side runner to the main runner also is gradual and the passage may be made at comparatively high speed, while at all times the current-collecting member during the transfer from the side runner to the main runner engages at least two portions of the device and forms a complete contact therewith.

Perforated ears 10 are provided on the opposite sides of the device for connection to cross spans or other supporting means to support and maintain the apparatus in position.

As shown in Fig. 4, the upper sides of the runners 4 and 5 are formed with grooves 11 and 12 in which the side and main wires lie respectively. T-shaped members 13 are bolted to the base member 1 by bolts 14 extending through the cross portion thereof with the lower ends of the T-shaped members engaging the trolley wires in the grooves 11 and 12, whereby the trolley wires are secured to the device.

Referring now to Figs. 6 to 9, a modification of the device hereinbefore described is shown. In this form of construction, the side runner 15 and the main runner 16 depend substantially the same distance downwardly from the base portion 1 instead of the side runner extending a greater distance downwardly than the main runner as in the construction shown in Figs. 1 to 5. The base wall 7 is done away with and only one base wall 17 is provided. As the side runner 15 projects substantially the same distance from the base 1 as the main runner 16, the channel 18 is formed deeper than in the construction previously described. The portion of the base wall 17 and the face of the channel 18, lying opposite each other, are provided with substantially the same curvature so that the passage from the side runner 15 onto the main runner 16 will, likewise in this form, be substantially smooth and with no change in level.

In both forms of the apparatus, the sides of the channels 8 and 18, adjacent the flanges 2, preferably are always a greater distance from the lower face of the base member 1 than the distance from the upper portion of the current-collecting members to the base plate 1, so that as the current-collecting members pass through the switch or frog from the narrow to the wide end thereof there is substantially no possibility of the current-collecting member engaging the channel and switching to the side runner even when considerable side force is applied in a direction tending to accomplish this. Therefore, the current-collecting member can pass in either direction along the main runner at a high rate of speed, with or without side pressure, without any danger of the current-collecting member jumping or being thrown from the main runner.

While we have shown and described various embodiments of the present invention, it will be apparent to those skilled in the art that various modifications may be made without departing from the spirit and scope of this invention, and therefore we wish to be limited only by the prior art and the scope of the appended claims.

We claim:

1. In a trolley switch, a main runner and a side runner terminating at its inner end adjacent said main runner, said main runner having a substantially diagonal groove across the lower side thereof extending in the general direction of said side runner and being substantially adjacent the inner end thereof, the upper face of said groove being spaced a distance below the upper portion of said main runner throughout the length of said groove whereby a current-collecting member may pass from said side runner to said main runner.

2. In a trolley switch, a main runner, a side runner terminating at its inner end adjacent said main runner, a base wall adjacent the outer side of the inner end of said side runner, the lower surface of said base wall being a distance above the lower edges and a distance below the upper portion of said runners, said main runner having a substantially diagonal groove opposite said base wall and extending in the general direction of said side runner whereby a current-collecting member may pass from said side runner to said main runner.

3. In a trolley switch, a main runner, a side runner terminating at its inner end adjacent said main runner, a base wall adjacent the outer side of the inner end of said side runner, the lower surface of said base wall being a distance above the lower edges and a distance below the upper portion of said runners, said main runner having a substantially diagonal groove opposite said base wall and extending in the general direction of said side runner, the inner face of said groove being substantially the same distance below the upper side of said side runner as said base wall whereby a current-collecting member may pass from said side runner to said main runner.

4. In a trolley switch, a continuous main runner, a side runner terminating at its inner end adjacent said main runner, a base wall adjacent the outer side of the inner end of said side runner, the lower face of said base wall being a sufficient distance above the lower edge of said side runner that a current-collecting member passing along said side runner may slide from said runner to said base wall, said main runner having a substantially diagonal groove across the lower side thereof opposite said base wall and extending in the general direction of said side runner, the upper face of said groove being substantially similarly situated with respect to the distance thereof above the lower edge of said side runner as said base wall whereby the upper sides of the current-collecting member will engage said base wall and said groove in passing from said side to said main runner.

5. In a trolley switch, a continuous main runner, a side runner terminating at its inner end adjacent said main runner, a base wall adjacent the outer side of the inner end of said side runner, said base wall being upwardly inclined at the ends thereof, and having the lower face of the base wall a sufficient distance above the lower edge of said side runner that a current-collecting member passing along said side runner may slide therefrom to said base wall, said main runner having a substantially helical groove opposite said base wall and extending in the general direction of said side runner, the upper faces of opposite portions of said groove and said base wall lying in substantially the same horizontal planes, whereby to engage opposite sides of said current-collecting member during the passage thereof from the side to the main runner.

6. In a trolley switch, a main runner and a side runner terminating at its inner end adjacent said main runner, the inner end of said side runner projecting below said main runner, said main runner having a substantially diagonal groove across the lower side thereof substantially adjacent the inner end of said side runner whereby a current-collecting member may pass from said side runner to said main runner.

7. In a trolley switch, a continuous main runner, a side runner terminating at its inner end adjacent said main runner, a base wall adjacent the outer side of the inner end of said side runner, the lower surface of said base wall being a distance above the lower edges and a distance below the upper portion of said runners, said main runner having a substantially diagonal groove opposite said base wall and extending in the general direction of said side runner, and a second base wall adjacent the inner side of said side runner, the inner face of said groove and the faces of said base walls being so arranged that the upper edges of a current-collecting member will pass under them and in contact therewith in passing from said side to said main runner.

8. In a trolley switch, a main runner, a side runner terminating at its inner end adjacent said main runner, a base wall adjacent the outer side of the inner end of said side runner, the lower face of said base wall being a sufficient distance above the lower edge of said side runner that a current-collecting member passing along said side runner may slide from said runner to said base wall, and a second base wall adjacent the inner side of said side runner and spaced from said main runner to form a channel therebetween, the upper faces of said base walls being substantially similarly situated with respect to the distances thereof above the lower edge of said side runner, said main runner having a substantially diagonal groove across the lower side thereof substantially opposite the inner end of said side runner.

9. In a trolley switch, a main runner and a side runner terminating at its inner end adjacent said main runner, the inner end of said side runner projecting below said main runner, a base wall adjacent the inner side of the inner end of said side runner, said main runner having a substantially diagonal groove of substantially less depth than the depth of said runner across the lower side thereof substantially adjacent the inner end of said side runner whereby a current-collecting member may pass from said side runner to said main runner, the upper face of said groove being substantially a continuation of the upper face of said base wall.

10. In a trolley switch, a continuous main runner, a side runner terminating at its inner end adjacent said main runner, a base wall adjacent the outer side of the inner end of said side runner, the lower surface of said base wall being a distance above the lower edges of said runners but below the upper portion of said main runner, said main runner having a substantially diagonal groove opposite said base wall and extending in the general direction of said side runner, and a second base wall adjacent the inner side of said side runner, the inner face of said groove and the faces of said base walls being so arranged that the upper edges of a current-collecting member will pass under them and in contact therewith in passing from said side to said main runner, said first base wall extending from substantially opposite the outer end of the second base wall to substantially opposite the outer end of said groove.

11. In a trolley switch, a main runner, a side runner terminating at its inner end adjacent said main runner, the inner end of said side runner projecting below said main runner, a base wall adjacent the outer side of the inner end of said side runner, the face of said base wall being above the lower edges of said side and main runners, the distance from the face of said base wall to the lower edge of said side runner being substantially the same as the distance from the inner face of a current-collecting member to the upper edges thereof, said main runner having a substantially diagonal groove across the lower side thereof opposite the inner end of said side runner and extending in the general direction thereof.

12. In a trolley switch, a main runner, a side runner terminating at its inner end adjacent said main runner, a base wall adjacent the inner side of the inner end of said side runner, the lower surface of said base wall being a distance above the lower edges and a distance below the upper portion of said runners, said main runner having a substantially diagonal groove of substantially less depth than the depth of said runner opposite said base wall and extending in the general direction of said side runner whereby a current-collecting member may pass from said side runner to said main runner.

13. In a trolley switch, a main runner, a side runner terminating at its inner end adjacent said main runner, said main runner having a substantially helical groove across the lower side thereof substantially adjacent the inner end of said side runner whereby a current-collecting member may pass from said side runner to said main runner.

14. In a trolley switch, a main runner, a side runner terminating at its inner end adjacent said main runner, a base wall adjacent the outer side of the inner end of said side runner, the lower surface of said base wall being a distance above the lower edge and a distance below the upper portion of said side runner, said main runner having a substantially diagonal groove across the lower side thereof substantially opposite said base wall and extending in the general direction of said side runner whereby a current-collecting member may pass from said side runner to said main runner.

15. In a trolley switch, a main runner, a side runner terminating at its inner end adjacent said main runner, a base wall adjacent the inner end of said side runner, the lower surface of said base wall being curved downwardly from the ends thereof, the lowermost portion of said base wall being a distance above the lower edge of said side runner, said main runner having a substantially diagonal groove opposite said base wall and extending in the general direction of said side runner whereby a current-collecting member may pass from said side runner to said main runner.

16. In a trolley switch, a main runner, a side runner terminating at its inner end adjacent said main runner, a base wall adjacent the outer side of the inner end of said side runner, said main runner having a substantially helical groove opposite said base wall and extending in the general direction of said side runner, the bearing faces of opposite portions of said groove and said base wall lying in substantially the same horizontal planes whereby to engage opposite sides of said current-collecting member during the passage thereof from the side runner to the main runner.

17. In a trolley switch, a main runner, a side runner terminating at its inner end adjacent said main runner, a base wall adjacent the outer side of the inner end of said side runner, the lower face of the base wall being a sufficient distance above the lower edge of said side runner that a current-collecting member passing along said side runner may slide smoothly therefrom to said base wall, said main runner having a substantially helical groove across the lower side thereof opposite said base wall and extending in the general direction of said side runner, the bearing faces of opposite portions of said groove and base wall lying in substantially the same horizontal planes whereby to engage opposite sides of said current collecting member during the passage thereof from the side runner to the main runner.

18. In a trolley switch, a continuous main runner, a side runner terminating at its inner end adjacent said main runner, a base wall adjacent the outer side of the inner end of said side runner, the lower surface of said base wall being a distance above the lower surfaces of said runners, said main runner having a substantially diagonal groove across the lower side thereof opposite said base wall and extending in the general direction of said side runner, and a second base wall adjacent the inner side of said side runner, the inner face of said groove and the faces of said base walls being so arranged that the upper edges of a current-collecting member will pass under them and in contact therewith in passing from said side runner to said main runner.

19. In a trolley switch, a main runner, a side runner terminating at its inner end adjacent said main runner having a substantially helical groove in the lower face thereof opposite the inner end of said side runner, a base wall adjacent the outer side of the inner end of said side runner, a second base wall adjacent the inner side of said side runner, the bearing faces of said base walls and said groove being substantially similarly situated with respect to the distances thereof above the lower edge of said side runner.

20. In a trolley switch, a main runner, and a side runner terminating at its inner end adjacent said main runner, the inner end of said side runner projecting below said main runner, said main runner having a substantially diagonal groove adjacent the inner end of said side runner whereby a current collecting member may pass from said side runner to said main runner.

21. In a trolley switch, a main runner, a side runner terminating at its inner end adjacent said main runner, said main runner having a substantially diagonal groove opposite the inner end of said side runner, a channel between said main runner and said side runner of sufficient size to permit the passage of a flange of a current-collecting member engaging said main runner, a base wall adjacent the outer side of the inner end of said side runner, the lower surface of said base wall being a distance above the lower edge of said side runner and a distance below the upper face of said last groove whereby a current-collecting member may pass from said side runner to said main runner while a current-collecting member passing along said main runner in the direction thereof will be prevented from switching to said side runner.

22. A trolley switch comprising a base portion, a main runner extending downwardly therefrom, a side runner extending downwardly therefrom and terminating at its inner end adjacent said main runner, said main runner having a diagonal groove therein across the lower side thereof, and a base wall extending downwardly from said base portion a substantial distance but less than that of said runners and being positioned adjacent said side runner.

23. In a trolley switch, a continuous main runner and a side runner, said main runner having a substantially diagonal groove across the lower side thereof to permit a current-collecting member to pass from said side to said main runner, said groove being of a depth throughout substantially less than the depth of said runner.

24. In a trolley switch, a continuous main runner and a side runner, said main runner having a substantially diagonal groove across the lower side thereof to permit a current-collecting member to pass from said side to said main runner, said groove being of a depth at the deepest part substantially less than the depth of said runner.

25. In a trolley switch, a main runner and a side runner, said main runner having a substantially diagonal groove across the lower side thereof substantially opposite the inner end of said side runner to permit a current-collecting member to pass from said side to said main runner, the upper surface of said groove being lower adjacent the middle than at the ends of said groove.

26. In a trolley switch, a side runner, a main runner having a substantially diagonal groove across the lower side thereof substantially opposite the inner end of said side runner to permit a current-collecting member to pass from said side to said main runner, and a base wall adjacent said side runner, the lower surface of said base wall being a distance above the lower edge and a distance below the upper portion of said side runner.

27. In a trolley switch, a continuous main runner and a side runner terminating at its inner end adjacent said main runner, said main runner being of a substantially greater depth than the distance from the inner face of a current-collecting member to be used therewith to the outer edges thereof and having a substantially diagonal groove across the lower side of less width than the width of the current-collecting member to permit a current-collecting member to pass from said side to said main runner, said groove being of less depth adjacent the ends thereof than the distance from the inner face of the current-collecting member to the outer edges thereof.

28. In a trolley switch, a continuous main runner and a side runner terminating at its inner end adjacent said main runner, said main runner being of a substantially greater depth than the distance from the inner face of a current-collecting member to be used therewith to the outer edges thereof and having a substantially diagonal groove across the lower side to permit a current-collecting member to pass from said side to said main runner, said groove being of less depth than the distance from the inner face of the current-collecting member to the outer edges thereof and having the upper face rounded longitudinally.

29. In a trolley switch, a main runner and a side runner terminating at its inner end adjacent said main runner, the inner end of said side runner projecting below said main runner, said main runner having a substantially helical groove across the lower side thereof substantially adjacent the inner end of said side runner to permit a current-collecting member to pass from said side to said main runner.

30. In a trolley switch, a continuous main runner and a side runner terminating at its inner end adjacent said main runner, said main runner being of a substantially greater depth than the distance from the inner face of a current-collecting member to be used therewith to the outer edges thereof, and having a substantially diagonal groove across the lower side to permit a current-collecting member to pass from said side to said main runner, said groove being of less depth than the distance from the inner face of a current-collecting member to the outer edges thereof and having the upper face rounded in cross section.

31. In a trolley switch for guiding a current-collecting member, a continuous main runner, a side runner terminating at its inner end adjacent said main runner, said main runner being of a substantially greater depth throughout than the distance from the inner face of a current-collecting member to be used therewith to the outer edges thereof and having a substantially diagonal groove across the lower side thereof substantially opposite the inner end of said side runner to permit a current-collecting member to pass from said side to said main runner, said groove being of such a form that the flange of a current-collecting member used therewith will extend upwardly beyond said groove at the outer end thereof and the contact surface of the current-collecting member will be in continuous contact with the lower side of said main runner when said current-collecting member is seated on said main runner.

RICHARD ROY HOLDEN.
ALMOUR W. NELSON.